United States Patent [19]

Takahashi

[11] Patent Number: 4,540,316

[45] Date of Patent: Sep. 10, 1985

[54] COMPOSITION FOR IMPROVING STRENGTH OF SOFT GROUND CONTAINING ORGANIC MATTER, AND METHOD OF IMPROVING STRENGTH OF SOFT GROUND BY UTILIZING SAID COMPOSITION

[76] Inventor: Yuichiro Takahashi, 1-2-6, Bandai, Niigata, Japan

[21] Appl. No.: 359,906

[22] Filed: Mar. 19, 1982

[30] Foreign Application Priority Data

Mar. 19, 1981 [JP] Japan .................. 56-40154

[51] Int. Cl.$^3$ .......... C09K 17/00; E02D 3/12
[52] U.S. Cl. ................ 405/264; 106/90; 405/266
[58] Field of Search ........... 405/263, 266, 267, 269, 405/264; 106/89, 90, 97, 98; 166/285, 292, 293, 294

[56] References Cited

U.S. PATENT DOCUMENTS 3,582,375  6/1971  Tragesser ............... 405/266 X
3,583,165  6/1971  West et al. ............. 405/266
4,019,327  4/1977  Kempster ............... 405/266 X
4,299,516  11/1981 Miyoshi et al. .......... 405/266
4,309,129  1/1982  Takahashi .............. 405/269

*Primary Examiner*—David H. Corbin
*Attorney, Agent, or Firm*—Becker & Becker, Inc.

[57] ABSTRACT

A method of improving, for building purposes, soft ground containing organic material utilizes a fluid composition, for injection into the ground, consisting of cement, water, bentonite and either sand or a lightweight, inert, finely divided, readily available naturally-occurring material such as volcanic ash, or an industrial or agricultural waste such as coal or incinerator ash, wood dust, powdered waste plastics material, cereal hulls or the like. The composition is injected at prescribed locations to effect replacement of portions of the soft ground and solidifies in situ, while because of the resulting pressure created on the surrounding ground soil water is expressed and the surrounding soft ground becomes compacted.

4 Claims, 6 Drawing Figures

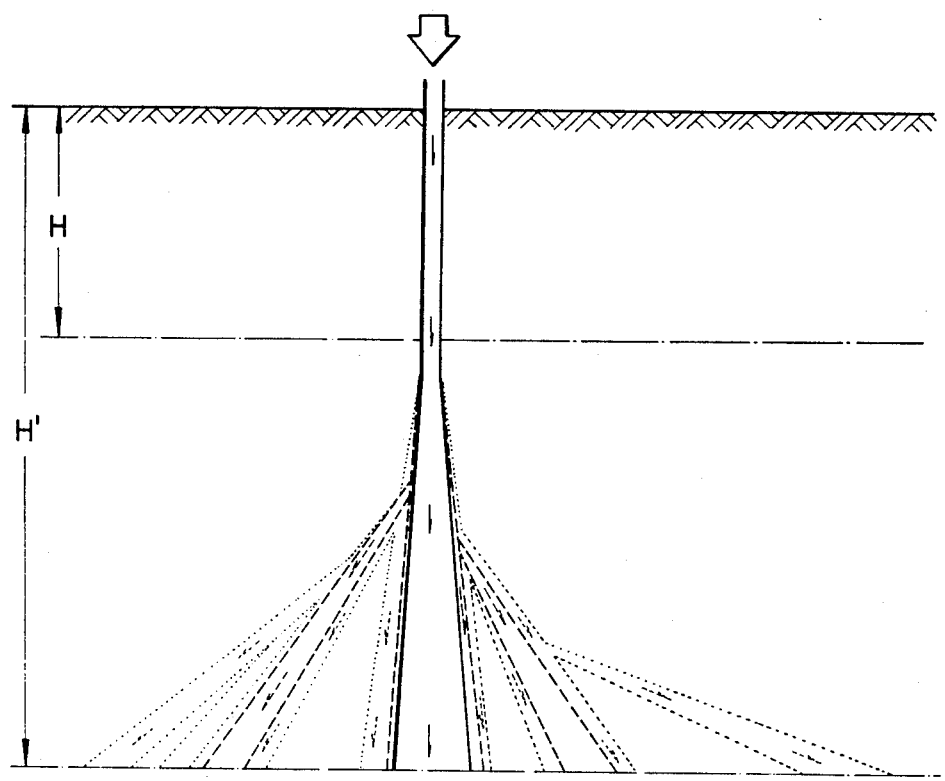

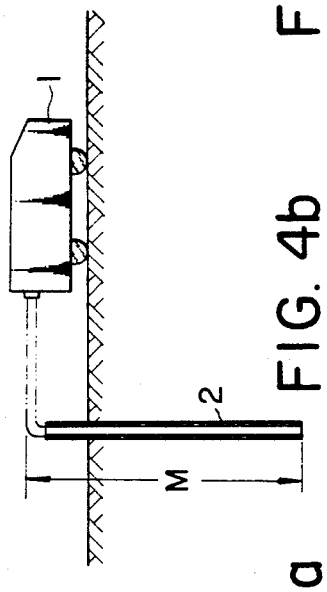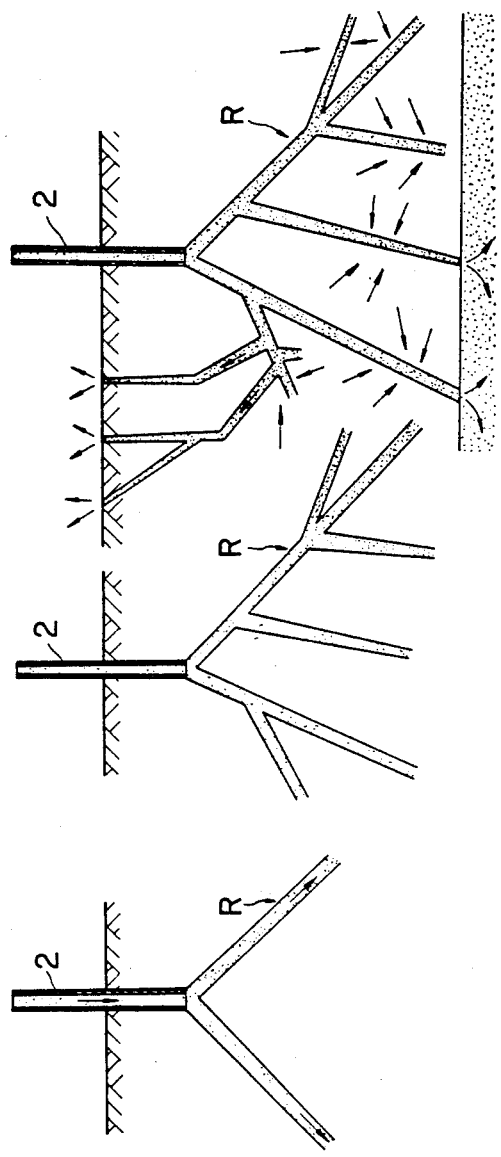

COMPOSITION FOR IMPROVING STRENGTH OF SOFT GROUND CONTAINING ORGANIC MATTER, AND METHOD OF IMPROVING STRENGTH OF SOFT GROUND BY UTILIZING SAID COMPOSITION

The present invention relates to a composition for consolidating soft or weak ground containing organic matter, and to a method of consolidating such ground by utilizing said composition.

As the amount of effectively utilizable land diminishes with further progress in social development, it appears that civil engineering works and land development, which until now have been carried out following the selection of sites having relatively favourable ground conditions, will gradually encounter limitations in terms of this margin for selection. The result has been further research devoted to various methods of executing civil engineering and land development projects at locations where poor subsoil conditions exist, and it has been found that an essential requirement is to improve and consolidate the ground that is unsatisfactory. One method that is commonly practised for the safe and rapid construction of structures on such unsatisfactory ground is an impregnation method according to which a consolidating material is injected into and made to impregnate the ground for such purposes as water cutoff and ground improvement. The most widely distributed form of such subsoil in Japan is of the viscous type whose properties are particularly poor in terms of compressibility and strength. Specifically, soft or weak subsoils containing organic matter such as peat, leaf mould and humic viscous earth pose the major problems encountered when attempting a project in such areas. Despite daily advances in technology, the fact remains that the actual conditions which prevail in such subsoil are not yet completely understood.

In connection with the impregnation method mentioned above, three well-known techniques exist for applying such method to ground of the aforesaid type. They are:

(1) void injection wherein the consolidating material is caused to impregnate the interstices or voids between the soil particles or particles of organic matter;

(2) pulsating impregnation, wherein penetration of the consolidating material into the weaker points of the soft ground layer is allowed to take place naturally; and (3) piling impregnation, according to which the soft ground layer is stirred into the form of cylinders and is then admixed with the consolidating agent, with the cylinders thereby hardening into column-like structures to make the supporting ground itself provide the load-bearing support in the form of hardened piles.

The most economical and commonly used impregnation material is cement which comprises essentially portland cement or fly ash cement. Such material is inorganic and is therefore non-polluting, unlike injected chemical agents or the like. It is noted, however, that the use of cement-based impregnation materials involves the following disadvantages with regard to organic soil.

(I) The hardening mechanism of cement, in which calcium occupies 60% of the total ingredients, derives from the reaction of the calcium ion. If the ground into which the cement is injected contains organic components, these components are adsorbed onto the calcium ions with the unfortunate consequence of a loss in the curing characteristics of the cement. The end result is a pronounced decline in the attainable strength upon hardening. It is therefore forbidden to practice cement treatment in areas where the soft subsoil contains large quantities of organic matter. Accordingly, lime treatment has been adopted as an alternative to cement, as is well known. Nevertheless, it has been confirmed that even the use of like is of no benefit in soft ground which possesses a humic content, consisting of peat or leaf mould or the like, of more than 0.05%, since it will not harden.

(II) Since ground containing organic matter is soft and therefore devoid of a constraining property, efforts made to improve piling structures meet with the following difficulties:

(a) Soil containing organic matter can be expected to offer almost no frictional resistance. Therefore, once a weakness develops in a portion of a pile as a result of vibration or some other cause, there exists the danger that such a flaw will lead to the successive collapse of the ground as a whole.

(b) Organic soil and the piling structure do not constitute a unitary body and therefore do not form a composite type ground layer. Hence, when stress, such as a load, is applied, the stress acts solely upon the piles and may cause pile destruction as well as marked destabilization of the ground in its entirety.

(c) Since no assistance can be obtained from frictional resistance for the reason set forth in (a) above, the ground directly beneath the pile must be made to bear the load. This can be an extremely uneconomical approach in cases where the soft ground layer has considerable thickness.

(III) Methods of improving organic ground by consolidation without relying upon impregnation are exemplified by the conventional methods of (a) dehydration and compaction accomplished by drainage of the vertical type, (b) replacement, wherein a portion of the soft ground is replaced, and (c) dehydration and compaction effected by laying soil and sand on the ground to an appropriate depth. It should be noted, however, that these methods share a common problem. Specifically, the methods (a) and (c) ordinarily require the application of a load to "squeeze out" the pure water, which load is often provided by a sand mat or the like. Sand is also commonly the material utilized to replace the soil removed in method (b).

Since soft ground containing organic matter is composed of alluvia which has a high groundwater content, the amount of settling or subsidence ascribable to the load is obviously great. When the soft ground is continuously subjected to a load in the form of sand, a saturated, loose sand layer develops below the shallow groundwater table. If this sand layer surpasses a thickness of 2 meters and the upper portion thereof is covered and restrained by a paved road surface, by land prepared for construction, or by a non-water-permeable structure, such as a viscous soil embankment along a road, vibration or like disturbance of the ground may, as a consequence of thixotropy, cause the so-called fluidization phenomenon to develop in the loose sand layer underlyig the water table. The severe instability consequent upon such fluidization can result in the total destruction of entire structures.

The method of the present invention represents a breakthrough in the art and is economically superior to the prior art in that costs can be reduced by in excess of 30% as compared with conventional methods.

It is therefore an object of the present invention to provide a solution to the difficulties which are encountered when groundimpregnation is applied to soft or weak ground that contains organic matter.

Another object of the present invention is to make it possible to utilize readily available inexpensive materials, as well as to put to use industrial and agricultural wastes.

According to the invention, there is provided a composition for injection to improve the structural strength of soft ground containing organic matter, said composition comprising cement, bentonite, water, and either sand or a lightweight finely-divided inert naturally-occurring or industrial or agricultural waste material.

More specifically, such composition may comprise cement, bentonite, water, and a substance A in the weight proportions 1.0:0.1–2.0:1.0–3.5:0.5–2.0, respectively, said substance A being one or more of volcanic ash, wood waste in powder form, waste plastics in powder form, coal ash from thermoelectric power plants, cereal hulls or like agricultural waste in powder form, incinerator ash, or other readily available finely divided natural or waste material having a similarly low specific gravity.

A further composition according to the invention comprises a cement, sand, bentonite and water in the proportions 1.0:2.0–8.0:0.1–1.5:0.5–3.0, respectively.

The invention further provides a method of improving the structural strength of soft ground containing organic matter utilizing such a composition, said method comprising the steps of replacing one or more portions of the ground by injecting said composition at prescribed locations, said composition being self-consolidating in situ after injection, and as a consequence of said replacement and consolidation causing the surrounding portions of said ground that have not been replaced to be compressed so that ground water is expressed squeezed from the soil and those portions become compacted.

Techniques for carrying the invention into practice will appear more clearly from the following description given with reference to the accompanying drawing, in which:

FIG. 2 is a diagrammatic view illustrating the relationship between the method according to the invention and a conventional method.

FIG. 3 is a schematic view of the apparatus used with the composition according to the present invention; and FIGS. 4a to 4c are diagrammatic views showing the three stages in the construction method used with the inventive composition.

Figure 1:
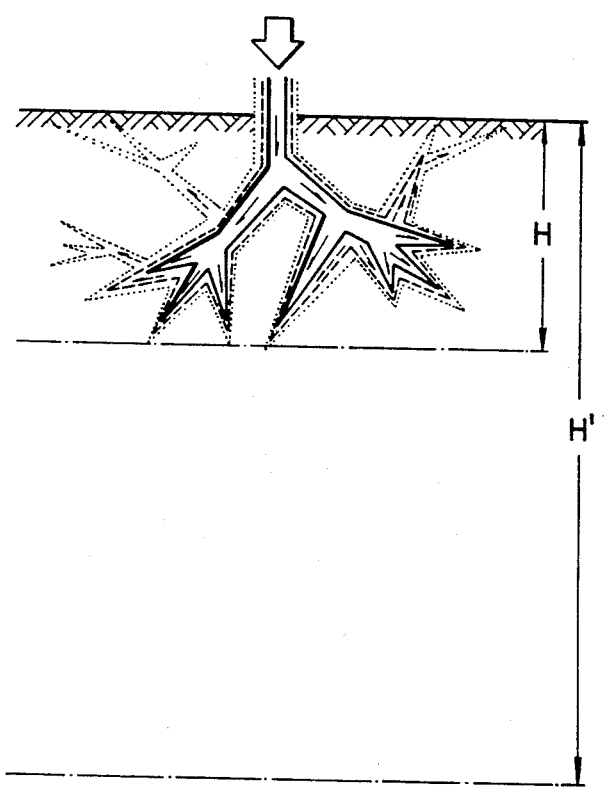
FIG. 1 is a diagrammatic view showing the basic principle of the invention.

The principles involved in the improvement and strengthening of ground as practised conventionally may be broadly classified under four headings including the following: (1) dehydration, (2) compaction, (3) consolidation or hardening, and (4) replacement. There have been many examples of cases where, according to conventional practice, various ground improving operations have used respective ones of the above principles in individual steps. The technique of the invention is characterized, firstly, by a composition for improving the strength of soft ground containing organic matter (which will be described in more detail later), and, secondly, by a method for utilizing this composition, whereby the four principles mentioned above can be readily employed in the same continuing process.

FIG. 1 illustrates diagrammatically the fundamentals of the method. A known specific impregnation apparatus is used to successively inject a replacement material composition 12 from preselected injection points 11 into the soft organic ground 13 which is to be improved, the control of the operation is so effected as to obtain the required increase in ground strength by the combined effects of compaction, dehydration and drainage for each injection operation, the end result being that the portion of the ground where replacement by the injected material composition has been effected forms a semi-consolidated replacement structure.

The aim is to effect an increase in ground strength as a result of progressive dehydration and compaction. The method does not seek to replace the water in the interstices between soil particles with the injected material, but rather is adapted to squeeze out the water via compaction. According to the principle applied herein, soft ground once consolidated by compaction in this way will remain so; that is, the consolidation mechanism is irreversible. The ground cannot return to its former state of weakness or softness, barring particularly extreme external conditions. As a result, the round can be endowed with the strength necessary for assuring its stability.

When conventional techniques are applied to work sites of a previously delineated area for the purpose of improving and consolidating the ground solely within the delineated zone, major difficulties are encountered as a result of adopting the prior-art impregnation systems using cement-based materials. Therefore, certain improvements, that eliminate the difficulties such as are encountered in the prior art, are provided by the material composition of the present invention.

There are two approaches that can be followed in connection with the injection of a fluid composition into the ground to consolidate a delineated zone. The first is to produce an increase in the frictional resistance to fluid flow at the boundaries of the zone to be consolidated so that the fluidized mass resulting from the injected fluid is contained and the region treated by the fluid composition injected is localized within the zone that is to be consolidated.

The second approach is to inject a fluid of low density, again to localize the region treated by it and to confine the treated region within a shallow layer, as illustrated by the example shown in FIG. 1. A comparison of these two approaches will show that the first is effective for a relatively thin layer of soft organic ground, especially when the object is to treat a weak stratum in its entirety; whereas the second approach is suitable when there is a deep stratum of soft organic ground and the object is to treat it only to a limited depth.

By using a suitable impregnaton apparatus to repeat the operations of injection, and consequent dehydration, compaction, drainage, replacement and consolidation or hardening, while controlling the injection operation in accordance with the particular objective to be achieved in either case, the weak stratum is progressively strengthened by the injected material. The advancing boundaries of the fluidized mass formed at each successive injection operation cooperate with other such boundaries formed during other injection operations to compress the weak stratum and thereby squeeze out its pore water as the treated region grows with successive injections of the particular fluid composition employed. Hence, in situ loading effects and in situ draining action are constantly at work at the interface system between the fluidized mass and the remainder of the ground layer to be strengthened, and the pore water is expressed or squeezed from the treated ground and cused to drain away. As a result, there is an abrupt increase in the degree of compaction of the weak stratum in the interface zone, and a simultaneous and proportional increase in ground strength. The proper regulation and management of the operation, in terms of the exact composition employed, the quantity of the injected material and the injection time, will depend on the particular nature of the site being treated.

A material that has been used in the first of the above approaches to injection, is one containing sand or sandy soil of an intermediate to fine particle size. However, for the second approach, the composition should contain material having a low specific gravity, such as ash residue from industrial wastes that have been burned in an incinerator, waste plastics in powder form, wood waste in powder form, volcanic ash, coal ash from thermoelectric power plants, and cereal hulls or other agricultural waste in powder form. The combination of materials used in the injection composition of the present invention is a departure in the art, and their compounding ratios have been verified on the basis of repeated experimentation. The composition comprises cement, bentonite, water, and a substance A in the proportions 1.0:0.1–2.0:1.0–3.5:0.5–2.0, respectively. The substance A is a naturally-occurring or waste material having a low specific gravity. It may consist of one of the group of naturally-occurring or waste materials mentioned above, or may be another readily available naturally-occurring or waste material having a similar specific gravity. Since the selection of substance A is dependent upon the conditions of the organic soil, the material selected will vary from site to site.

The inclusion of bentonite as part of the composition serves several purposes. Bentonite homogenizes each of the ingredients and produces a stable colloidal suspension. It also imbues the impregnation fluid with the required fluidity. Blending bentonite first with water and the waste material, and then finally adding cement thereto, imbues the resulting injection fluid with an expansion characteristic that determines the rate of change in the volume at the time of consolidation. Additionally, bentonite serves to contain the components within the fluidized mass, thereby preventing any traces of possibly harmful substances contained in the industrial waste from being dissolved and diffused in the ground water. Bentonite thus acts as a form of binder for the purpose of impregnation and asures that no environmental pollution will accompany ground injection in areas where certain chemical agents could pose a problem.

The method allows the four principles of ground improvement to be observed in the same process, as described above, thereby providing a faster and more economical method of strengthening the ground. However, the replacement and consolidation steps are, in a sense, performed in order to achieve dehydration and compaction, which are the prime factors in achieving the desired ground improvement.

The injected composition should comprise readily available materials as low in cost as possible. An advantage of the method is that one can select primarily materials that do not waste scarce resources and materials that are obtained by utilizing industrial and agricultural wastes.

As described above, one of the major problems encountered in the impregnation techniques which are currently employed is poorer hardening of cement materials in organic soil. In this regard, the cement employed in the present inventive method need only provide a comparatively low strength to the soil-replacement body which forms in the ground following injection, since the object of the method is largely to achieve a consolidation effect by expulsion of the soil water and compaction. In other words, the method was not derived in anticipation of the consolidated area achieving a high degree of hardness. It is sufficient if the strength of the cement is equivalent to the ground strength, as judged on the basis of the finally acquired degree of compaction.

However, the method does seek to prevent the fluidization phenomenon that might otherwise be expected to arise consequent upon the occurrence of ground tremors or vibrations, and thereby to avoid a disaster resulting from collapse of the ground. It also seeks to confine any traces of harmful substances, which may be contained in an injection material comprising industrial wastes, to the area of the injected ground. It does so by causing the injected material to solidify and harden to some degree so that any trace substance will not escape and spread from the injected area. Various experiments have been conducted to achieve these ends, the result being the composition defined for the present invention. Accordingly, another advantage of the method is a higher level of structural reliability and public safety.

FIG. 2 shows the basic principle of ground improvement according to a prior conventional technique which relies upon pulsation injection of a cement-based injection material alone, to create a deep piling structure 14. Since no ground improvement is possible by this technique within the soft upper layer 13, and consequently no structural assistance is available from that layer, the final effect is that of a building standing on a number of comparatively slender unreinforced well-spaced piles or columns 15, and the existence of the deep lateral system 16 does not contribute significantly to the integrity of the structure.

By contrast, in the method according to the invention, not only does the injected composition 12 itself create a shallow spreading consolidated system 10 but also the surrounding soft ground layer 13 is compacted so as to create a substantial underground "raft" for building purposes. It will be clear that even if the system 14, 15 in FIG. 2 hardens to a high degree and extends to greater than the full depth H' of the soft ground layer, while the system 10 of FIG. 1 hardens to only a small degree and extends only to the shallow depth H, the structural stability achieved in FIG. 1 is much greater because of the spread of the system at a shallow depth and the compaction of the surrounding ground.

The present invention is carried out with the method and apparatus which has been already developed by the inventor and patented in several countries (U.S. Pat. No. 4,309,129 Takahashi dated Jan. 5, 1982; Canadian Pat. No. 1,096,646 and U.K. Pat. No. 1,601,308)

The operating principle of the construction method will now be explained with reference to FIGS. 3 and 4.

The composition according to the present invention is injected by a pump 1 and a conduit 2 from a reservoir mounted on the ground surface. It will be seen that the injecting pressure $P$ ($kg/cm^2$) may be expressed by the formula:

$$P = (A \times M) + D$$

where A is the density of the injected composition in kg/cm², M the height of the liquid column in cm and D the discharge pressure of the pump, in kg/cm².

Supposing that the ground has the strength g(t/m²), the ground can be destructed to permit injection of the composition when P>Q. The balanced condition P=Q is reached when the ground has been sufficiently strengthened and the injected composition starts to be forced back towards the reservoir against the pumping pressure. When such state has been attained, the pumping operation can be safely discontinued, because such state is usually an indication that the ground has been consolidated satisfactorily. In FIG. 4a, the injection composition has started to be pumped into the ground formation (P>Q). FIG. 4b shows the balanced condition P=Q and FIG. 4c shows the condition P<Q. In FIGS. 4a to 4c R designates a branched wall structure formed upon hardening of the injected composition.

If the injection pressure for the composition is set at the outset to a value larger than the local ground strength, the relationship P>Q can be maintained, and injection can be carried out consecutively.

Experiments were conducted with the above-mentioned apparatus and method, the results of which are summarized in the following Table.

larly low specific gravity resulting in a minimum of solidification rather than a completely solidified and substituted mass.

2. A composition for consolidation injection to improve the structural strength of soft ground containing organic matter, said composition having improvement in combination therewith comprising: a cement, sand, bentonite and water in the proportions 1.0:2.0–8.0:0-.1–1.5:0.5–3.0, respectively, as an additive serving (1) for compaction and dehydration; (2) as an in-situ substituent additive; (3) a drainage for reworking and discharging water contained in the ground; and (4) a solidifying and strengthening additive.

3. A method of improving the structural strength of soft ground containing organic matter utilizing a composition including at least cement, bentonite, water and a lightweight finely divided inert material, said method having improvement in combination therewith comprising: the steps of replacing at least one portion of the ground by consolidation injecting said composition at prescribed locations, said composition being self-consolidating in situ after injection, and as a consequence of said replacement and consolidation causing the surrounding portions of said ground that have not been replaced to be compressed so that ground water is squeezed from the soil that is dehydrated as well as consolidated and those portions become compacted so

TABLE

| | Composition (weight ratio) | Strength of the ground to be improved | End strength | Strength of the ground improved |
|---|---|---|---|---|
| Experiment 1 | Cement:Sand:Bentonite:Water<br>1:5.8:0.1:1.9<br>1:5.7:0.2:1.8 | $q = 0.7 \sim 1.0 (t/m^2)$ | $qc' \geq 1.6 (t/m^2)$ | $q' = 1.6 \sim 2.0 (t/m^2)$ |
| Experiment 2 | Cement:Bentonite:Water:Powdered cereal hulls<br>1:0.1:1.4:0.5<br>1:0.2:1.3:0.5 | $q = 0.5 \sim 0.8 (t/m^2)$ | $qc' \geq 1.2 (t/m^2)$ | $q' = 1.2 \sim 1.7 (t/m^2)$ |

I claim:

1. A composition for consolidation injection thereby to form cracks in the ground and to improve the structural strength of soft ground containing organic matter, said composition having improvement in combination therewith comprising: cement, bentonite, water, and a substance A in the proportions 1.0:0.1–2.0:1.0–3.5:0-.5–2.0, respectively, said substance A being one or more of volcanic ash, wood waste in powder form, waste plastics in powder form, coal ash from thermoelectric power plants, cereal hulls or like agricultural waste in powder form, incinerator ash, or other readily available finely divided natural or waste material having a similar that in principle improvement is involved for the ground herewith as generally catagorized into compaction/dehydration, draining, solidification and substitution as four aspects thereof applied at the same time.

4. The method according to claim 3, carried out in a soft ground layer of considerable depth, said method having improvement in combination therewith comprising: a further step of treating primarily only an upper comparatively shallow portion of the soft ground without any disturbing whatever relative to the ground to be improved.

* * * * *